Jan. 17, 1967 KAZUTOSHI IKEGAMI ETAL 3,299,407

ELECTRONIC DIGITAL COMPUTER PROVIDED WITH A DRUM TYPE MEMORY DEVICE

Filed Aug. 6, 1963

United States Patent Office 3,299,407
Patented Jan. 17, 1967

3,299,407
ELECTRONIC DIGITAL COMPUTER PROVIDED WITH A DRUM TYPE MEMORY DEVICE

Kazutoshi Ikegami, Kitatama-gun, Tokyo-to, and Akira Kamoi, Musashino-shi, Japan, assignors to Kabushiki Kaisha Hitachi Seisakusho, Tokyo-to, Japan, a joint-stock company of Japan Filed Aug. 6, 1963, Ser. No. 300,281
Claims priority, application Japan, Aug. 11, 1962, 37/45,753; Aug. 15, 1962, 37/33,783
2 Claims. (Cl. 340—172.5)

Figure 1:
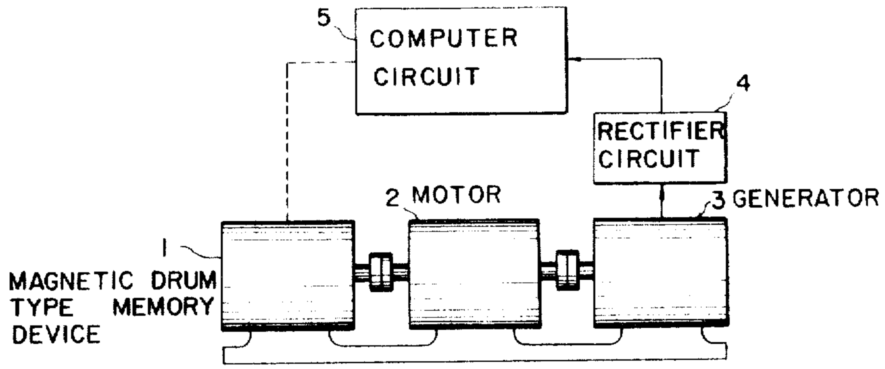

The present invention relates to an improved electronic digital computer provided with a magnetic drum type memory device, and more particularly it relates to an electronic digital computer in which a magnetic drum and an electric motor-generator are directly coupled with each other, whereby stabilization of voltage of an electric power source and simplification of the computing apparatus by elimination of an electric motor for driving the magnetic drum are secured.

In an electronic digital computer, various kinds of circuits, being supplied with constant D.C. power, perform predetermined arithmetic operations under the control of clock-pulses. Therefore, any instantaneous variations of power thus supplied to the circuits or of repetition frequency of the clock-pulses cause malfunction in the circuits and error in computation.

For the sake of eliminating the above-mentioned disadvantages of the conventional electronic digital computer, a sufficiently large stored energy is required, whereby the filter in the rectifier circuit used for obtaining said stored energy is made to be extremely large scale.

Any pulsatile voltage variation of an electric power source can be compensated by stored energy of a capacitor when the duration of such a variation is extremely short. However, in the case of voltage variation of an electric power source such as a variation of a relatively long period from several fractions of a second to at longest several seconds due to over current for short duration caused by, for example, starting of an electric motor except that of the computer or due to exciting current of a transformer, or voltage variation due to a voltage drop for the duration of said period it is impossible to store a sufficiently large energy in the filter equipped in the rectifier circuit. Therefore, hitherto, an electric motor-generator has been occasionally used in the electronic computer in order to eliminate the above-mentioned disadvantage. However, the ability of compensating a voltage variation of a short period caused by a rotary inertia energy of an electric motor-generator is extremely much larger than that caused by the stored energy of a filter in the rectifier circuit. Furthermore, use of a filter having the same function as that of an electric motor-generator makes the apparatus very large, thus causing the apparatus to be very uneconomical.

It is an essential object of the present invention to provide an improved electronic digital computer having no disadvantages as described above.

The said object and the other objects of this invention have been attained by coupling directly a magnetic drum with an electric motor-generator in such a manner that said magnetic drum can be utilized as a flywheel for the motor-generator.

The present invention is based on the fact that the magnetic drum to be used in the electronic computer has a large inertia moment.

Figure 2:
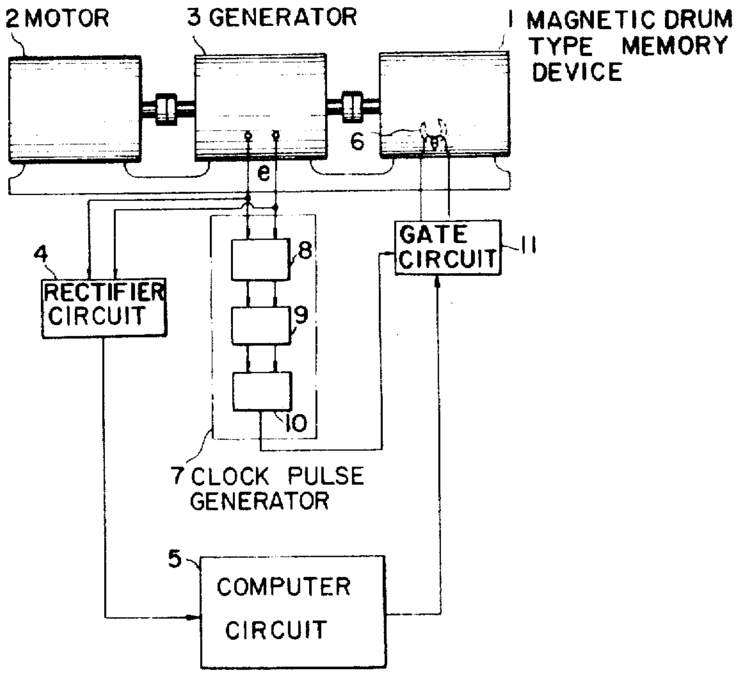

The details of the invention as well as the manner in which the foregoing objects and advantages of the present invention may be best achieved will be more clearly apparent by reference to the following description of a representative embodiment of the invention when taken in conjunction with the accompanying drawings, in which the same members are designated by the same reference numerals, and in which:

FIG. 1 is a block connection diagram showing a main part of a computer according to this invention; and FIG. 2 is a block connection diagram showing one embodiment for producing clock-pulses to be used in the computer of this invention.

Referring to FIG. 1, the main part of the computer of this invention comprises a magnetic drum type memory device 1, an electric motor 2, an electric generator 3, said device, motor, and generator being directly coupled, a rectifier circuit 4 for rectifying and filtering the output voltage of the said generator 3 and including a filter (not shown) and a computer circuit 5 to which the output power of said rectifier circuit 4 is applied.

According to the apparatus of FIG. 1, an electric motor for driving the magnetic drum, said electric motor having been conventionally necessary, can be eliminated and the magnetic drum acts as a flywheel of the motor-generator, thus increasing the inertia energy of the apparatus. Furthermore, since the magnetic drum is directly coupled with the electric motor-generator, the clock-pulses being used for writing in and reading out signals on the magnetic drum can be taken out of the output side of the motor-generator. The concrete manner of producing such clock-pulses is illustrated in FIG. 2.

The apparatus of FIG. 2 comprises an electric motor 2, an electric generator 3, a magnetic drum, rotary shafts for said motor-generator and said drum, directly coupled together, a signal write-in and read-in head 6, a rectifier circuit 4, a clock-pulse generator 7, and a gate circuit 11. The clock-pulse generator 7 produces a series of clock-pulses based on A.C. output voltage $e$ of generally sine wave generated in the generator 3 and comprises, for example, a circuit 8 for multiplying or dividing the frequency of said output voltage $e$ so as to obtain a voltage having a desirable frequency, a clipping circuit 9 for differentiating the output signal of the circuit 8 or picking up the differentiated wave of one polarity, and a circuit 10 for amplifying and shaping the output pulse of the clipping circuit 9. The output of the clock-pulse generator 7 is applied to the gate circuit 11, whereby synchronization of the write-in and read-out signals at the head 6 is attained. A part of the A.C. output voltage of the generator 3 is converted to a direct current through the circuit 4 and this direct current output voltage is used as an electric power source of the other computing circuits.

As described above, according to this invention, a magnetic drum is directly coupled with an electric motor-generator and synchronization of a write-in or read-out signal is achieved by use of the clock-pulse converted from a part of the output side of the generator, so that the variation of rotation of the magnetic drum always correspond to frequency variations of the clock-pulses. Accordingly, the above-mentioned synchronization can be always stably attained, thus decreasing the generation of erroneous operation. Furthermore, since the magnetic drum is driven by the power source provided as a power source for a computer itself, the exclusive electric motor for the magnetic drum can be eliminated, and since the magnetic drum acts as a flywheel of the motor-generator, stabilization of the output voltage of the motor-generator is secured with a practically favorable result. If frequency stabilization is required, it necessitates only an automatic control which comprises detecting the variation of the generator output and maintaining the rotation of the apparatus at a certain speed by means of the said detected signal.

While the invention has been explained by describing particular embodiments thereof, it will be apparent that improvements and modifications may be made without departing from the scope of the invention as defined in the appended claims.

What is claimed is:

1. In an electronic digital computer, an improvement comprising a motor-generator operatively generating an A.C. output; a magnetic drum memory device provided with write-in and read-out heads thereover; connecting means for mechanically coupling said motor-generator with said magnetic drum in shaft-to-shaft coupling together; and circuit means supplied with said output of said motor-generator and supplying a D.C. output to said computer.

2. The improvement according to claim 1 wherein there is further provided a clock-pulse generator supplied with said A.C. output of said motor-generator and supplying clock-pulses generated therein to said heads over said magnetic drum.

No references cited.

ROBERT C. BAILEY, *Primary Examiner.*

R. ZACHE, *Assistant Examiner.*